Patented Apr. 25, 1944

2,347,266

UNITED STATES PATENT OFFICE 2,347,266

ISOMERIZATION OF PARAFFINIC HYDROCARBONS

Vladimir N. Ipatieff and Louis Schmerling, Chicago, Ill., assignors to Universal Oil Products Company, Chicago, Ill., a corporation of Delaware No Drawing. Application January 20, 1939, Serial No. 251,972

11 Claims. (Cl. 260—683.5)

The process of this invention relates to the treatment of paraffin hydrocarbons of normal or straight-chain structure.

In a more specific sense, the invention is concerned with a process whereby normal or straight-chain paraffin hydrocarbons are converted into branched-chain paraffin hydrocarbons, the process involving the use of special catalysts and particular conditions of operation which favor the isomerization reactions so that relatively high yields of the iso or branched-chain compounds are produced.

The formation of iso or branched-chain paraffin hydrocarbons from the corresponding straight-chain liquid paraffins is desirable because of the generally higher anti-knock value of the iso compounds. Furthermore, the branched-chain paraffins both gaseous and liquid, being generally more reactive than the corresponding normal hydrocarbons, may be utilized in the production of other branched-chain paraffins by so-called alkylation reactions in the presence of suitable catalysts. Also, lower boiling isoparaffins, such as isobutane and isopentane, may be dehydrogenated to the corresponding branched-chain olefins, which are utilizable for the production of high quality aviation gasoline, by a combination of catalytic polymerization followed by hydrogenation of the polymers, producing paraffinic motor fuel.

In one specific embodiment, the process of the present invention comprises the treating, under superatmospheric hydrogen pressures, of normal paraffin hydrocarbons for the isomerization thereof into branched-chain paraffin hydrocarbons with catalysts comprising aluminum chloride sludges produced in hydrocarbon conversion reactions involving aluminum chloride.

Normal paraffin hydrocarbons with which the process of the present invention is concerned may be either gaseous or liquid. Normal butane, which constitutes the gaseous normal paraffin which may be isomerized by the process of this invention, is produced in considerable quantities in the oil refining industry. Both normal butane and isobutane occur in substantial amounts in natural gases (in which the normal compound usually predominates), in refinery gases which are evolved from crude petroleum storage tanks, and in the primary distillation of crudes, and they are also present in considerable percentages in the gases produced incidental to cracking heavy petroleum fractions for the production of gasoline. In the case of cracked gas mixtures the relative proportions of iso and normal butanes vary, but the ratio of the iso to the normal compound is as a rule considerably higher than in natural gas.

Butanes may be considered as more or less marginal compounds in respect to their desirability in ordinary gasoline, that is, a certain percentage of them is essential for sufficient vapor pressure to insure ease in starting, while an excess tends to produce vapor lock. For these reasons the total percentage of 4-carbon atom hydrocarbons is commonly adjusted in conjunction with the boiling range and vapor pressure of the other gasoline components to produce a gasoline of desirable starting characteristics according to seasonal demands.

The butanes at the present time bear a further important relationship to oil refining in that their excess production is being utilized as a source of gasoline either by ordinary thermal cracking or by special catalytic dehydrogenation processes followed by polymerization in which catalysts may or may not be used. Investigations have shown that isobutane is considerably more amenable to cracking and dehydrogenation, both with and without catalysts, than the normal compound. Considering the corresponding mono-olefins, the normal butenes are considerably more difficult to polymerize, either thermally or catalytically, than isobutene, and it is found, also, that the octenes representing the dimers of the isobutene are of higher antiknock value than those from n-butenes, which holds also for the octanes produced by hydrogenation. It is, therefore, of considerable importance at the present time to convert as much as possible of the normal butane production into isobutane.

Liquid normal paraffins are produced in considerable quantities in the oil refining industry. They occur in substantial amounts in natural gasolines, in the higher boiling constituents of natural gas commonly known as "casing head gasoline," and in gasolines produced in relatively high yields by the cracking of relatively heavy petroleum fractions. In the case of cracked gasolines, the relative proportions of iso and normal paraffins vary.

A feature of the process of the present invention consists in the use, under superatmospheric hydrogen pressure, of sludges produced in hydrocarbon reactions involving aluminum chloride, notably those of polymerization and/or alkylation in the presence of aluminum chloride and hydrogen chloride.

Sludges which may be used as catalyst in the process of this invention consist, generally, of complex mixtures of hydrocarbons, hydrogen chloride, free and combined aluminum chloride, and aluminum chloride which has reacted to a minor degree with water, or with other oxygen compounds forming other aluminum compounds of which hydroxyaluminum dichloride is representative. Such sludges are formed, for instance, when gases produced incidental to the cracking of petroleum fractions for the manufacture of gasoline are treated with aluminum chloride in the presence of hydrogen chloride. Reactions thus occur by which the olefins of the gas are converted mainly into polymers under certain conditions; while under other conditions, certain of the paraffins, notably the lower boiling isoparaffins, are alkylated by the olefinic constituents with the production of higher boiling useful paraffinic hydrocarbons. After such polymerization or alkylation reactions have continued for some time, the catalyst, originally dry and granular, changes to a pasty or sludge-like mass which no longer retains its high catalytic activity for the reactions in which it was used in it.

According to the process of the present invention, it has been found that such aluminum chloride sludges may be contacted with normal paraffin hydrocarbon fractions under hydrogen pressure and at elevated temperatures, whereby a substantial portion of the normal paraffin hydrocarbons are converted into corresponding isoparaffins, or other branched-chain paraffin hydrocarbons. The use of superatmospheric hydrogen pressure is of considerable importance in effecting paraffin isomerizations in the presence of aluminum chloride sludges, because of its effect in substantially reducing the so-called "autodestructive alkylation," whereby a portion of the paraffin hydrocarbon undergoing treatment is converted into lower boiling and higher boiling hydrocarbons.

In one form of operation of the process of the present invention, the normal paraffin hydrocarbon fraction and the aluminum chloride sludge are placed in a suitable autoclave, under superatmospheric pressure of hydrogen in the approximate range of 15–150 atmospheres and heated to temperatures in the approximate order of 200–400° F., for approximately 1–4 hours. After such treatment, the hydrocarbon fraction is separated from the catalyst and subsequently fractionated, if desired, to separate chosen fractions of the isomerized paraffin hydrocarbon product, which may be used in the production of high antiknock aviation gasoline, or be utilized in further hydrocarbon conversion reactions.

Continuous operation may be conducted, also, by passing the normal paraffin fraction with hydrogen and a small amount of hydrogen chloride through a chamber in which the aluminum chloride sludge is agitated with the normal paraffin fraction at an elevated temperature under superatmospheric pressure.

The process of this invention may be carried out, also, in chambers containing the sludge deposited upon porous or non-porous carriers or supports, such as crushed pumice, firebrick, quartz, etc.

In general, the contact time of the normal paraffin with the catalyst may be decreased in such continuous isomerization from that required to effect this change in batch operations. Catalyst temperatures used in the continuous operations are also substantially higher than those employed in batch operations, being in the former case in the approximate range of 300–500° F. The exact temperature preferred in carrying out the process of this invention will depend, to a large extent, upon the nature of the normal paraffin hydrocarbon being treated, the extent of reaction desired and the time of contact utilized which is ordinarily in the approximate range of 60–600 seconds during operation at the higher temperatures in the indicated range. While the particular conditions needed for obtaining optimum isomerization of narrow boiling paraffin fractions cannot be predicted, it appears that substantially more severe temperature conditions are needed to effect a given isomerization of the lower boiling paraffins than are required for similar conversions of higher boiling homologs. For instance, normal pentane may be isomerized to a greater extent than is true with normal butane in the presence of the same isomerization catalyst under like conditions of temperature, pressure, and time.

The process of this invention may be applied to a number of paraffin hydrocarbon fractions to effect isomerization thereof, but the conditions for effecting optimum results are necessarily dependent upon factors such as the chemical nature, structure and boiling range of the fractions undergoing treatment and it is not intended to infer that any particular conditions or combination of conditions of operation are equivalent.

The following numerical data are presented to indicate some of the results obtainable in isomerizing normal paraffin hydrocarbons by the present process, although it is not intended to limit the scope of the invention in strict accordance therewith:

*Example 1*

A high pressure rotating autoclave was charged with 64.8 parts by weight of normal butane and 37.3 parts by weight of an aluminum chloride sludge produced in the polymerization of ethylene by means of aluminum chloride in the presence of minor amounts of hydrogen chloride. The charged autoclave was closed, placed under approximately 100 atmospheres hydrogen pressure, and heated for 4 hours at approximately 300° F. After the reaction, the products removed from the autoclave consisted of 22.1 parts by weight of sludge, 2.0 parts by weight of aluminum chloride, 4.9 parts by weight of hydrocarbons condensing at 0° C. (32° F.), 74.0 parts by weight of gases liquefied at −78° C. (−108° F.), and 5.0 parts by weight of non-condensable gases. A low temperature fractional distillation separated the condensable gases into the following products:

|  | Weight, per cent | Parts by weight |
|---|---|---|
| Propane | 3.7 | 2.0 |
| Isobutane | 21.3 | 15.8 |
| n-Butane | 72.3 | 53.7 |
| Pentanes and higher hydrocarbons | 2.7 | 2.5 |

The above results show that 24.4% by weight of the normal butane charged was converted into isobutane.

Example 2

In a similar run 75.6 parts by weight of normal butane and 46.4 parts by weight of aluminum chloride sludge were heated in a rotating autoclave at 392° F. for 4 hours under approximately 100 atmospheres initial hydrogen pressure. Products from this treatment consisted of 12.6 parts by weight of sludge, 3.8 parts by weight of aluminum chloride, 2.1 parts by weight of hydrocarbons condensing at 0° C. (32° F.), 81.1 parts by weight of gaseous hydrocarbons liquefiable by a cooling mixture consisting of solid carbon dioxide and acetone (temperature —78° C.) and 24.0 parts by weight of non-condensable gases. Low temperature fractional distillation separated the the liquefied gas into the following fractions:

|  | Weight, per cent | Parts by weight |
| --- | --- | --- |
| Ethane | 4.9 | 2.2 |
| Propane | 21.4 | 14.4 |
| Isobutane | 39.5 | 33.7 |
| n-Butane | 32.8 | 29.2 |
| Pentanes and higher hydrocarbons | 1.4 | 1.6 |

Comparison of these results with those given in Example 1 show that while isomerization of normal butane into isobutane here reached approximately 44%, more decomposition of the butanes into lower boiling hydrocarbons occurred at the higher temperature, namely, 392° F. than was observed at approximately 300° F.

Example 3

Sixty parts by weight of normal pentane and 36.6 parts by weight of aluminum chloride sludge were heated in a rotating autoclave at approximately 300° F. for 4 hours under approximately 100 atmospheres initial hydrogen pressure. After the experiment, the products of the reaction were found to consist of 28.7 parts by weight of sludge, 1.8 parts by weight of non-condensable gases exclusive of the remaining hydrogen, 5.7 parts by weight of hydrocarbons condensed at —78° C. (—108° F.), 13.3 parts by weight of hydrocarbons condensing at 0° C. (32° F.), and 31.3 parts by weight of a liquid hydrocarbon layer; 15.8 parts by weight of materials being lost. Analysis of the hydrocarbon product showed it to consist of 0.2 part by weight of propane, 1.0 part by weight of butanes, and 49.1 parts by weight of pentanes consisting of approximately 40% isopentane and 60% normal pentane.

A similar run with 60 parts by weight of normal pentane in the presence of 32.9 parts by wieght of aluminum chloride sludge but at 392° F. (200° C.) under 100 atmospheres initial hydrogen pressure caused a greater amount of decomposition of the normal pentane than was observed in the previously mentioned run at 300° F. After the experiment at 392° F., the recoveries were 9.2 parts by weight of sludge, 3.9 parts by weight of aluminum chloride, 15.7 parts by weight of non-condensable gases exclusive of the remaining hydrogen, 40 parts by weight of gases liquefying at —78° C., 10.5 parts by weight of hydrocarbons condensing at 0° C. (32° F.) and 5.0 parts by weight of liquid hydrocarbons; a total of 8.6 parts by weight of materials being lost in the experiment. Analysis showed the products of this reaction to consist of the following: 6.6 parts by weight of methane, 11.1 parts by weight of ethane, 13.7 parts by weight of propane, 8.5 parts by weight of isobutane, 7.7 parts by weight of normal butane, and 8.2 parts by weight of pentanes of which 80% was isopentane. From these results it is apparent that decomposition of pentanes to lighter products predominated during the relatively long time of treatment at 392° F.

The character of the process of the present invention and particularly its commercial value are evident from the preceding specification and limited numerical data presented, though neither section is intended to be unduly limiting in its generally broad scope.

We claim as our invention:

1. A process for isomerizing normal paraffins of at least 4 carbon atoms to the molecule which comprises contacting the paraffin hydrocarbons, at a temperature in the approximate range of 200–500° F. and under a hydrogen pressure of about 15–150 atmospheres, with a sludge produced in an independent hydrocarbon condensation reaction in the presence of aluminum chloride.

2. A process for isomerizing normal paraffins of at least 4 carbon atoms to the molecule which comprises contacting the paraffin hydrocarbons, at a temperature in the approximate range of 200–500° F. and under a hydrogen pressure of about 15–150 atmospheres, with a sludge produced in an independent olefin polymerization reaction in the presence of aluminum chloride.

3. A process for isomerizing normal paraffins of at least 4 carbon atoms to the molecule which comprises contacting the paraffin hydrocarbons, at a temperature in the approximate range of 200–500° F. and under a hydrogen pressure of about 15–150 atmospheres, with a sludge produced in an independent hydrocarbon alkylation reaction in the presence of aluminum chloride.

4. A process for converting normal paraffins of at least 4 carbon atoms to the molecule into branched chain paraffins, which comprises contacting the normal paraffin under isomerizing conditions with a sludge produced in an independent hydrocarbon condensation reaction in the presence of aluminum chloride.

5. A process for converting normal paraffins of at least 4 carbon atoms to the molecule into branched chain paraffins, which comprises contacting the normal paraffin under isomerizing conditions and in the presence of hydrogen with a sludge produced in an independent hydrocarbon condensation reaction in the presence of aluminum chloride.

6. A process for converting normal paraffins of at least 4 carbon atoms to the molecule into branched chain paraffins, which comprises contacting the normal paraffin under isomerizing conditions and in the presence of hydrogen chloride with a sludge produced in an independent hydrocarbon condensation reaction in the presence of aluminum chloride.

7. A process for converting normal paraffins of at least 4 carbon atoms to the molecule into branched chain paraffins, which comprises contacting the normal paraffin under isomerizing conditions and in the presence of hydrogen and hydrogen chloride with a sludge produced in an independent hydrocarbon condensation reaction in the presence of aluminum chloride.

8. A process for treating a hydrocarbon fraction boiling in the gasoline range and containing a normal paraffin, which comprises contacting said fraction under paraffin isomerizing conditions and under a substantial hydrogen pressure with a sludge produced in an independent hydrocarbon condensation reaction in the presence of aluminum chloride.

9. The process as defined in claim 8 further characterized in that said fraction is contacted with said sludge in the presence of hydrogen chloride.

10. The process as defined in claim 1 further characterized in that the paraffin hydrocarbons are contacted with said sludge in the presence of hydrogen chloride.

11. A process for converting normally liquid straight chain paraffins into branched chain paraffins, which comprises contacting the straight chain paraffin hydrocarbons, together with hydrogen chloride, at a paraffin isomerizing temperature and under a hydrogen pressure of at least 15 atmospheres, with a sludge produced in an independent hydrocarbon condensation reaction in the presence of aluminum chloride.

VLADIMIR N. IPATIEFF.
LOUIS SCHMERLING.